(12) United States Patent
Bandyopadhyay et al.

(10) Patent No.: US 7,129,191 B2
(45) Date of Patent: Oct. 31, 2006

(54) COMPOSITION USEFUL FOR PREPARATION OF DENSE NEODYMIUM STABILISED β-SILICON NITRIDE-α-SIALON COMPOSITE

(75) Inventors: Siddhartha Bandyopadhyay, West Bengal (IN); Himadri Sekhar Maity, West Bengal (IN)

(73) Assignee: Council of Scientific and Industrial Research, New Delhi (IN)

( * ) Notice: Subject to any disclaimer, the term of this patent is extended or adjusted under 35 U.S.C. 154(b) by 37 days.

(21) Appl. No.: 10/974,013

(22) Filed: Oct. 27, 2004

(65) Prior Publication Data

US 2006/0089249 A1 Apr. 27, 2006

(51) Int. Cl.
*C04B 35/596* (2006.01)
*C04B 35/599* (2006.01)

(52) U.S. Cl. .................. 501/97.2; 501/97.4; 501/98.2; 501/98.3

(58) Field of Classification Search ............... 501/98.2, 501/97.2, 97.4, 98.3
See application file for complete search history.

(56) References Cited

U.S. PATENT DOCUMENTS

| 4,421,528 | A | * | 12/1983 | Buljan et al. | .................. 51/309 |
| 5,032,553 | A | * | 7/1991 | Tarry | .......................... 501/98.2 |
| 5,413,972 | A | * | 5/1995 | Hwang et al. | ............. 501/98.2 |
| 5,908,798 | A | * | 6/1999 | Chen et al. | ................. 501/98.2 |
| 6,824,727 | B1 | * | 11/2004 | Roy et al. | .................... 264/414 |

* cited by examiner

*Primary Examiner*—Karl Group
(74) *Attorney, Agent, or Firm*—Nixon & Vanderhye P.C.

(57) ABSTRACT

The present invention consists of a synergistic mixture of $Si_3N_4$, $Al_2O_3$, AlN, $SiO_2$ and $Nd_2O_3$. The cost effective synergistic composition is useful for the preparation of dense neodymium stabilised β-$Si_3N_4$-α-SiAlON composite of the order of >98% theoretical density, having high hardness and high fracture toughness. The dense β-$Si_3N_4$-α-SiAlON composite will be useful for low temperature applications as wear parts like bearing and roller materials and particularly for grinding and milling operations like grinding balls.

6 Claims, No Drawings

COMPOSITION USEFUL FOR PREPARATION OF DENSE NEODYMIUM STABILISED β-SILICON NITRIDE-α-SIALON COMPOSITE

FIELD OF THE INVENTION

The present invention relates to a synergistic composition useful for the preparation of dense neodymium stabilised β-$Si_3N_4$-α-SiAlON composite. Dense β-$Si_3N_4$-α-SiAlON composite finds usage in low temperature applications such as wear parts like bearing and roller materials and particularly for grinding and milling operations like grinding balls.

BACKGROUND OF THE INVENTION

It is known in the art to hot pressing green mixtures of $Si_3N_4$, AlN, $Al_2O_3$ and $Nd_2O_3$, at a temperature in the range of 1550° to 1750° C., and at a pressure of about 20 MPa (Wang et al. in Mater. Res. Soc. Symp. Proc., Vol. 287, 1993, pp. 387–392 titled "Formation and densification of R-α' SiAlONs (R=Nd,Sm,Gd,Dy,Er,Yb)"). Shen et al. (J. Am. Ceram. Soc., Vol. 79, No. 3, 1996, pp. 721–32 titled "Homogeneity region and thermal stability of neodymium-doped α SiAlON ceramics") teach hot pressing to fabricate the material as stated above.

O'Reilly et al. (Mater. Res. Soc. Symp. Proc., Vol. 287, 1993, pp. 393–398 titled "Parameters affecting pressureless sintering of α' SiAlONs with lanthanide modifying cations") discloses that green mixture containing similar starting materials as above were pressureless sintered but yielded only 50% α-SiAlON in the sintered product. Kall et al. (J. Eur. Ceram. Soc., Vol. 6, 1990, pp. 191–27, titled "Sialon ceramics made with mixtures of $Y_2O_3$—$Nd_2O_3$ as sintering aids") discloses that green mixtures were pressureless sintered above 1825° C. Although the high temperature firing could produce fully sintered material, the pressureless sintering at 1750° C. could only produce up to 96% of theoretical density even when α-SiAlON is completely absent.

The major drawbacks of the above noted hitherto known processes are that these involve selection of a composition that requires hot pressing for full densification, which is evidently expensive. It is also difficult to manufacture a complex-shaped material and also failed to produce high densification under pressure less sintering method.

Thus, there is a need to provide a composition for preparation of dense neodymium stabilised β-$Si_3N_4$-α-SiAlON composite, which overcome the above disadvantages.

OBJECTS OF THE INVENTION

The main object of the present invention is to provide a synergistic composition useful for the preparation of dense neodymium stabilised β-$Si_3N_4$- α-SiAlON composite, which obviates the drawbacks of the hitherto known prior art.

Another object of the present invention is to provide a synergistic composition, useful for the preparation of dense neodymium stabilised β-$Si_3N_4$-α-SiAlON composite, wherein the composition consists of a synergistic mixture of $Si_3N_4$, $Al_2O_3$, AlN, $SiO_2$ and $Nd_2O_3$.

Still another object of the present invention is to provide a synergistic composition, useful for the preparation of dense neodymium stabilised β-$Si_3N_4$-α-SiAlON composite, wherein the composition displays easier densification under normal sintering conditions.

Yet another object of the present invention is to provide a synergistic composition, wherein a cheaper additive oxide such as neodymium oxide in comparison to other oxides such as dysprosium oxide or ytterbium oxide, makes the composition economic.

SUMMARY OF THE INVENTION

The present invention provides a synergistic composition useful for the preparation of dense neodymium stabilised β-$Si_3N_4$-α-SiAlON composite, wherein the composition consists of a synergistic mixture of $Si_3N_4$, $Al_2O_3$, AlN, $SiO_2$ and $Nd_2O_3$.

Accordingly, the present invention provides a synergistic composition useful for the preparation of dense neodymium stabilised β-$Si_3N_4$-α-SiAlON composite, which comprises:
$Si_3N_4$: 49 to 63 mole %,
$Al_2O_3$: 2.5 to 3.5 mole %,
AlN: 29 to 43 mole %,
$SiO_2$: 2.1 to 2.9 mole %, and
$Nd_2O_3$: 3.1 to 4.9 mole %.

In an embodiment of the present invention, the $Si_3N_4$ contains oxygen less than 1 weight %.

In another embodiment of the present invention, the $Al_2O_3$ is of purity greater than 98%.

In still another embodiment of the present invention, the AlN contains oxygen less than 2.5 weight %.

In yet another embodiment of the present invention, the $SiO_2$ is of purity greater than 98%

In still yet another embodiment of the present invention, the $Nd_2O_3$ is of purity greater than 98%.

The composition of the present invention is not a mere admixture but a synergistic mixture having properties which are distinct and different from the mere aggregation of the properties of the individual ingredients. There is no chemical reaction in the said synergistic mixture.

DETAILED DESCRIPTION OF THE INVENTION

The present invention provides a synergistic composition useful for the preparation of dense neodymium stabilised β-$Si_3N_4$-α-SiAlON composite. The composition comprises essentially of:
$Si_3N_4$: 49 to 63 mole %,
$Al_2O_3$: 2.5 to 3.5 mole %,
AlN: 29 to 43 mole %,
$SiO_2$: 2.1 to 2.9 mole %, and
$Nd_2O_3$: 3.1 to 4.9 mole %.

The $Si_3N_4$ contains oxygen less than 1 weight %. The $Al_2O_3$ is preferably of purity greater than 98%. The AlN preferably contains oxygen less than 2.5 weight %. The $SiO_2$ is also preferably of purity greater than 98%. The $Nd_2O_3$ is of purity greater than 98%.

The novelty of the present invention resides in providing a synergistic composition useful for the preparation of dense neodymium stabilised β-$Si_3N_4$-α-SiAlON composite, wherein the product obtained using the selected compositional zone from the system $Si_3N_4$—$Al_2O_3$.AlN—$Nd_2O_3$.9AlN—$SiO_2$ exhibits α-SiAlON as single crystalline phase with excellent sinterability and possesses a final density value of not less than 98% of theoretical in the temperature range >1750° C. This has been made possible by providing a composition which consists of a synergistic mixture of $Si_3N_4$, $Al_2O_3$, AlN, $SiO_2$ and $Nd_2O_3$.

Our copending application Ser. No. 10/974,016 describes and claims a process for the manufacture of dense neodymium stabilised β-Si$_3$N$_4$-α-SiAlON composite from the synergistic composition of the present invention, which comprises preparing a homogeneous mixture of the composition, passing the powder through 100 mesh, pressing the powder to form green compacts, sintering the green compacts at a temperature in the range of 1700° to 1900° C. in nitrogen atmosphere.

The sintering is found to be enhanced in β-Si$_3$N$_4$-α-SiAlON compositions when selected from the system Si$_3$N$_4$—Al$_2$O$_3$.AlN—Nd$_2$O$_3$.9AlN—SiO$_2$. It is believed that the mechanism is as follows: In general, the sintering of the α-SiAlON materials are difficult primarily due to the presence of some secondary intermediate crystalline phases. In cases of both yttrium- as well as some rare earth-doped compositions, the melilite phase, M$_2$O$_3$.Si$_3$N$_4$ (M=Y, Yb, Dy, Sm, Nd, etc.) often containing aluminium in solid solution, occur frequently together with α-SiAlON in the intermediate sintering temperature range. The phase absorbs large amount of the doping element and becomes competitive for the volume fraction of the liquid phase present thereby hindering densification and the precipitation of α-SiAlON as well. The final densification of the material therefore becomes dependent on the dissociation temperatures of the melilite which promotes the amount of the liquid phase once again at high temperature so that the sintering proceeds. The extent of the melilite phase formation is favoured when the starting composition is taken in the nitrogen rich side of the compositional zone. It is believed that the introduction of SiO$_2$ in the starting composition disfavours the formation of the nitrogen rich crystalline phases like melilite etc. and also favours the formation of a larger amount of liquid during sintering thereby promoting an improved densification at comparatively lower temperature with respect to the compositions without SiO$_2$.

The following examples are illustrative of the use of the synergistic composition of the present invention and therefore, should not be construed to limit the scope of the invention in any manner.

EXAMPLE 1

A composition containing Si$_3$N$_4$— 53.3 mole %, Al$_2$O$_3$— 2.6 mole %, AlN— 37.7 mole %, Nd$_2$O$_3$— 4 mole % and SiO$_2$— 2.4 mole %, was attrition milled for 3 h, dried, cold pressed under isostatic pressure and was fired at 1750° C. for 2 h in a nitrogen gas atmosphere under a gas pressure of 1 MPa. The linear shrinkage was 15.72%, the firing weight loss was 2.14%. The fired density was 98.06% of the theoretical value. The β-Si$_3$N$_4$:α-SiAlON phase ratio is lesser than 1:5.

EXAMPLE 2

A composition containing Si$_3$N$_4$— 53.3 mole %, Al$_2$O$_3$— 2.6 mole %, AlN— 37.7 mole %, Nd$_2$O$_3$— 4 mole % and SiO$_2$— 2.4 mole %, was attrition milled for 3 h, dried, cold pressed under isostatic pressure and was fired at 1800° C. for 2 h in a nitrogen gas atmosphere under a gas pressure of 1 MPa. The linear shrinkage was 16.11%, the firing weight loss was 2.2%. The fired density was 98.64% of the theoretical value. The β-Si$_3$N$_4$:α-SiAlON phase ratio is lesser than 1:5.

EXAMPLE 3

A composition containing Si$_3$N$_4$— 53.3 mole %, Al$_2$O$_3$— 2.6 mole %, AlN— 37.7 mole %, Nd$_2$O$_3$— 4 mole % and SiO$_2$— 2.4 mole %, was attrition milled for 3 h, dried, cold pressed under isostatic pressure and was fired at 1825° C. for 2 h in a nitrogen gas atmosphere under a gas pressure of 1 MPa. The linear shrinkage was 16.13%, the firing weight loss was 2.28%. The fired density was 98.76% of the theoretical value. The β-Si$_3$N$_4$:α-SiAlON phase ratio is lesser than 1:5.

EXAMPLE 4

A composition containing Si$_3$N$_4$— 53.3 mole %, Al$_2$O$_3$— 2.6 mole %, AlN— 37.7 mole %, Nd$_2$O$_3$— 4 mole % and SiO$_2$— 2.4 mole %, was attrition milled for 3 h, dried, cold pressed under isostatic pressure and was fired at 1850° C. for 2 h in a nitrogen gas atmosphere under a gas pressure of 1 MPa. The linear shrinkage was 16.32%, the firing weight loss was 2.29%. The fired density was 98.84% of the theoretical value. The hardness of the final product is 18.6 GPa. The fracture toughness of the final product is 4.7 MPa.m$^{1/2}$. The β-Si$_3$N$_4$:α-SiAlON phase ratio is lesser than 1:5.

EXAMPLE 5

A composition containing Si$_3$N$_4$— 53.3 mole %, Al$_2$O$_3$— 2.6 mole %, AlN— 37.7 mole %, Nd$_2$O$_3$— 4 mole % and SiO$_2$— 2.4 mole %, was attrition milled for 3 h, dried, cold pressed under isostatic pressure and was fired at 1900° C. for 2 h in a nitrogen gas atmosphere under a gas pressure of 1 MPa. The linear shrinkage was 16.19%, the firing weight loss was 2.71%. The fired density was 98.81% of the theoretical value. The β-Si$_3$N$_4$:α-SiAlON phase ratio is lesser than 1:5.

EXAMPLE 6

A composition containing Si$_3$N$_4$— 49.06 mole %, Al$_2$O$_3$— 2.75 mole %, AlN— 41.50 mole %, Nd$_2$O$_3$— 4.50 mole % and SiO$_2$— 2.19 mole %, was attrition milled for 3 h, dried, cold pressed under isostatic pressure and was fired at 1750° C. for 2 h in a nitrogen gas atmosphere under a gas pressure of 1 MPa. The linear shrinkage was 16.14%, the firing weight loss was 1.98%. The fired density was 98.22% of the theoretical value. The β-Si$_3$N$_4$:α-SiAlON phase ratio is greater than 3:1.

EXAMPLE 7

A composition containing Si$_3$N$_4$— 49.06 mole %, Al$_2$O$_3$— 2.75 mole %, AlN— 41.50 mole %, Nd$_2$O$_3$— 4.50 mole % and SiO$_2$— 2.19 mole %, was attrition milled for 3 h, dried, cold pressed under isostatic pressure and was fired at 1800° C. for 2 h in a nitrogen gas atmosphere under a gas pressure of 1 MPa. The linear shrinkage was 16.29%, the firing weight loss was 1.98%. The fired density was 98.39% of the theoretical value. The β-Si$_3$N$_4$:α-SiAlON phase ratio is greater than 3:1.

EXAMPLE 8

A composition containing Si$_3$N$_4$— 49.06 mole %, Al$_2$O$_3$— 2.75 mole %, AlN— 41.50 mole %, Nd$_2$O$_3$— 4.50 mole % and SiO$_2$— 2.19 mole %, was attrition milled for 3 h, dried, cold pressed under isostatic pressure and was fired at 1850° C. for 2 h in a nitrogen gas atmosphere under a gas pressure of 1 MPa. The linear shrinkage was 16.38%, the firing weight loss was 2.09%. The fired density was 98.44% of the theoretical value. The β-$Si_3N_4$:α-SiAlON phase ratio is greater than 3:1.

EXAMPLE 9

A composition containing $Si_3N_4$— 49.06 mole %, $Al_2O_3$— 2.75 mole %, AlN— 41.50 mole %, $Nd_2O_3$— 4.50 mole % and $SiO_2$— 2.19 mole %, was attrition milled for 3 h, dried, cold pressed under isostatic pressure and was fired at 1900° C. for 2 h in a nitrogen gas atmosphere under a gas pressure of 1 MPa. The linear shrinkage was 16.18%, the firing weight loss was 2.22%. The fired density was 98.41% of the theoretical value. The β-$Si_3N_4$:α-SiAlON phase ratio is greater than 3:1.

The Main Advantages of the Present Invention are:
1. Provides a synergistic composition, useful for the preparation of dense neodymium stabilised β-$Si_3N_4$-α-SiAlON composite.
2. Provides a synergistic composition, useful for the preparation of dense neodymium stabilised β-$Si_3N_4$-α-SiAlON composite, wherein the composition displays easier densification under normal sintering conditions.
3. Provides a synergistic composition, wherein a cheaper additive oxide such as neodymium oxide in comparison to other oxides such as dysprosium oxide or ytterbium oxide, makes the composition economic.
4. Provides a synergistic composition which does not require hot pressing thereby providing a cost effective method for the preparation of β-$Si_3N_4$-α-SiAlON material.

We claim:
1. A composition for preparation of dense neodymium stabilised β-$Si_3N_4$-α-SiAlON composite, which comprises:
    $Si_3N_4$: 49 to 63 mole %,
    $Al_2O_3$: 2.5 to 3.5 mole %,
    AlN: 29 to 43 mole %,
    $SiO_2$: 2.1 to 2.9 mole %, and
    $Nd_2O_3$: 3.1 to 4.9 mole %.
2. A composition as claimed in claim 1, wherein the $Si_3N_4$ contains less than 1 weight % oxygen.
3. A composition as claimed in claim 1, wherein the $Al_2O_3$ has purity greater than 98 weight %.
4. A composition as claimed in claim 1, wherein the AlN contains less than 2.5 weight % oxygen.
5. A composition as claimed in claim 1, wherein the $SiO_2$ has purity greater than 98 weight %.
6. A composition as claimed in claim 1, the $Nd_2O_3$ has purity greater than 98 weight %.

* * * * *